United States Patent
Pögel

(10) Patent No.: US 11,620,902 B2
(45) Date of Patent: Apr. 4, 2023

(54) METHOD AND DEVICE FOR DISPLAYING LANE INFORMATION IN A VEHICLE

(71) Applicant: Volkswagen Aktiengesellschaft, Wolfsburg (DE)

(72) Inventor: Tobias Pögel, Schwülper (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 168 days.

(21) Appl. No.: 16/628,393

(22) PCT Filed: Jun. 19, 2018

(86) PCT No.: PCT/EP2018/066277
§ 371 (c)(1),
(2) Date: Jan. 3, 2020

(87) PCT Pub. No.: WO2019/007680
PCT Pub. Date: Jan. 10, 2019

(65) Prior Publication Data
US 2020/0219392 A1    Jul. 9, 2020

(30) Foreign Application Priority Data
Jul. 7, 2017    (DE) .................. 10 2017 211 600.5

(51) Int. Cl.
| G08G 1/0962 | (2006.01) |
| B60K 35/00 | (2006.01) |
| G01C 21/36 | (2006.01) |
| G08G 1/01 | (2006.01) |

(52) U.S. Cl.
CPC ......... *G08G 1/09626* (2013.01); *B60K 35/00* (2013.01); *G01C 21/367* (2013.01);
(Continued)

(58) Field of Classification Search
None
See application file for complete search history.

(56) References Cited

U.S. PATENT DOCUMENTS

| 6,269,304 B1 * | 7/2001 | Kaji .................. G01C 21/3658 |
| | | 342/70 |
| 6,446,000 B2 | 9/2002 | Shimabara .................... 701/428 |

(Continued)

FOREIGN PATENT DOCUMENTS

| DE | 102004036825 A1 * | 10/2005 | ............ B60W 40/02 |
| DE | 102004036825 A1 | 10/2005 | ............ B60K 31/00 |

(Continued)

OTHER PUBLICATIONS

German Office Action, Application No. 102017211600.5, 7 pages, dated Feb. 20, 2018.

(Continued)

Primary Examiner — Maceeh Anwari
Assistant Examiner — Aarron E Santos
(74) Attorney, Agent, or Firm — Slayden Grubert Beard PLLC

(57) ABSTRACT

The invention relates to a method for displaying lane information in a vehicle. In the method, the present position of the vehicle on a route is captured. A number of existing traffic lanes at the present position in the direction of travel of the vehicle on the route is determined. Furthermore, the lane course of the existing traffic lanes that lies ahead of the vehicle in the direction of travel of the vehicle is determined, wherein a first traffic lane is determined from the lane course, which is a target traffic lane for the vehicle. In a first display region, a first display is generated, which shows a schematic illustration of the existing traffic lanes at the present position of the vehicle, which schematic illustration comprises schematic traffic lanes, wherein the number of the schematic traffic lanes corresponds to the number of the (Continued)

existing traffic lanes, such that an existing traffic lane is assigned a schematic traffic lane in each case. Moreover, for at least one first schematic traffic lane, a graphic object is generated which indicates whether the traffic lane assigned to the first schematic traffic lane is the target traffic lane, A first change position on the route is determined, as of which a second and no longer the first traffic lane is the target traffic lane for the vehicle and a second display is generated in a second display region, which shows a schematic illustration of the existing traffic lanes at the first change position on the route.

12 Claims, 5 Drawing Sheets

(52) U.S. Cl.
CPC ....... *G01C 21/3658* (2013.01); *G08G 1/0112* (2013.01); *G08G 1/0125* (2013.01); *B60K 2370/152* (2019.05); *B60K 2370/16* (2019.05)

(56) References Cited

U.S. PATENT DOCUMENTS

| | | | | |
|---|---|---|---|---|
| 7,127,350 | B2* | 10/2006 | Oikubo | G01C 21/3658 701/437 |
| 9,052,503 | B2 | 6/2015 | Gassner et al. | |
| 2001/0027377 | A1* | 10/2001 | Shimabara | G01C 21/3658 701/437 |
| 2008/0211693 | A1* | 9/2008 | Okuno | G01C 21/3667 340/995.26 |
| 2011/0264368 | A1* | 10/2011 | Machino | G01C 21/3658 701/533 |
| 2017/0089717 | A1* | 3/2017 | White | G08G 1/0112 |
| 2019/0128696 | A1* | 5/2019 | Quint | G01C 21/3461 |

FOREIGN PATENT DOCUMENTS

| | | | | |
|---|---|---|---|---|
| DE | 102007027297 A1 | 12/2008 | .......... | G08G 1/0965 |
| DE | 102011006347 A1 | 10/2012 | ............ | G01C 21/36 |
| DE | 102015223656 A1 | 6/2017 | .......... | G08G 1/0968 |
| DE | 102017211600 A1 | 1/2019 | .......... | G08G 1/0969 |
| JP | 2009008573 A | 1/2009 | ............ | G01C 21/00 |
| JP | 2015155857 A | 8/2015 | ............ | G01C 21/34 |
| WO | 2019/007680 A1 | 1/2019 | ............ | G01C 21/36 |

OTHER PUBLICATIONS

International Search Report and Written Opinion, Application No. PCT/EP2018/066277, 9 pages, dated Sep. 6, 2018.

* cited by examiner

METHOD AND DEVICE FOR DISPLAYING LANE INFORMATION IN A VEHICLE

CROSS-REFERENCE TO RELATED APPLICATIONS

This application claims priority to German Patent Application No. DE 10 2017 211 600.5, filed on Jul. 7, 2017 with the German Patent and Trademark Office. The contents of the aforesaid Patent Application are incorporated herein for all purposes.

TECHNICAL FIELD

The present invention relates to a method for displaying lane information in a vehicle. Furthermore, the invention relates to a device for displaying lane information in a vehicle.

BACKGROUND

In current navigation systems, lane information is displayed as a projection, which relates to the lane situation as occurs for the next maneuver to be performed. It is hereby problematic that multiple changes in lane guidance can take place between the current vehicle position and the next maneuver point. A representation in relation to the next maneuver point is thus not transferable to the current situation. Since the situation at the next maneuver point is often not yet visible due to the distance between the current vehicle position and the next maneuver point, this often results in misinterpretations of the shown situation.

DE 10 2007 027 297 A1 describes a display of traffic and infrastructure information in a vehicle. Predictive information and recommended actions that go beyond the immediate surroundings of the vehicle and represent the current traffic situation are hereby to be made available to the driver. A driving route projection is displayed. Driving recommendations are thereby output.

DE 10 2011 006 347 A1 describes a method for outputting graphic driving instructions. The driving instructions are thereby projected into the field of vision of the driver in a contact-analog manner by means of a head-up display. The driving instructions can thereby direct the driver to a target traffic lane.

DE 10 2004 036 825 A1 describes a predictive driver assistance system, which outputs predictive information about the route that lies ahead of the vehicle using digital maps to the driver. The system thereby detects situations in which there are several alternative driving routes for the vehicle. A prediction of the route that the driver will most likely select is then displayed.

SUMMARY

An object exists to provide a method and a device by means of which an intuitive navigation display that can be captured quickly can be generated for a driver.

The object is solved by a method and a device according to the independent claims. Embodiments of the invention are the discussed in the dependent claims and the following description.

DETAILED DESCRIPTION

Figure 1:
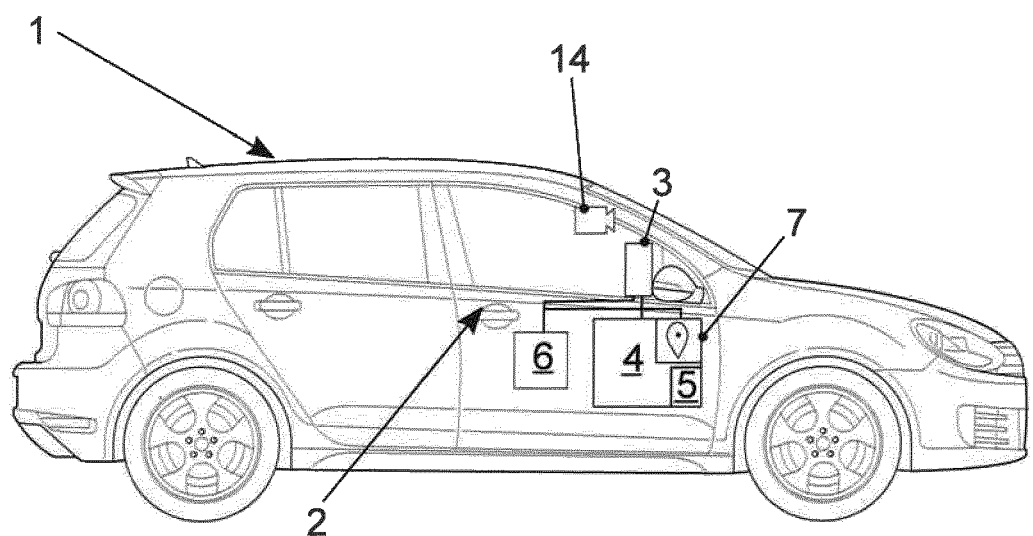
FIG. 1 shows a vehicle with a device for displaying lane information.

According to a first exemplary method for displaying lane information, the present position of the vehicle on a route is captured. A number of existing traffic lanes at the present position in the direction of travel of the vehicle on the route is determined. Furthermore, the lane course of the existing traffic lanes that lies ahead of the vehicle in the direction of travel of the vehicle is determined, wherein a first traffic lane is determined from the lane course, which is a target traffic lane for the vehicle. Moreover, in a first display region, a first display is generated which shows a schematic illustration of the existing traffic lanes at the present position of the vehicle, which schematic illustration comprises schematic traffic lanes, wherein the number of the schematic traffic lanes corresponds to the number of the existing traffic lanes such that an existing traffic lane is assigned a schematic traffic lane in each case. Furthermore, for at least one first schematic traffic lane, a graphic object is generated, which indicates whether the traffic lane assigned to the first schematic traffic lane is the target traffic lane. A first change position is determined on the route, from which first change position a second traffic lane and no longer the first traffic lane is the target traffic lane for the vehicle. In a second display region, a second display is then generated, which shows a schematic illustration of the existing lanes at the first change position on the route.

Accordingly, the target traffic lane for the vehicle is the traffic lane that the vehicle should follow to remain on the route. This means that, e.g., such lanes are target lanes that end in an exit to be taken in order to remain on the route. For example, lanes are not target lanes if they become bus or taxi lanes or otherwise end on the route. Furthermore, a change position may, e.g., be a position in which the number of lanes changes. This may for example be the case if a traffic lane for an exit is added to the other traffic lanes for the change position. If the driver needs to take the exit in order to remain on the route, the target lane thus changes. In such a case, the first change position is a maneuver point where not following the route results in an abandoning of the route. The target traffic lane may however also change if a traffic lane for use by the vehicle also ceases to exist. The traffic lane may thereby cease to exist in that it ends, turns into a bus or taxi lane or turns into an exit that the vehicle however should not take. The method according to the present aspect is thus also particularly suited for situations not only relating to the maneuver point of a route, but also to general lane changes.

Through the method according to the present aspect, the driver is beneficially shown both the traffic lanes presently existing on the route in the first display region as well as the traffic lanes existing in the future on the route in the second display region. The driver is thus not surprised by suddenly occurring lane changes. Furthermore, additional information, such as the distance available for a lane change, may be displayed on the second display. Moreover, the type of lane change may be displayed. For example, it may be output if the target traffic lane turns into an exit.

A schematic illustration of the existing traffic lanes shows, e.g., the number of traffic lanes next to each other. An actually existing traffic lane may thereby be assigned to each of these schematic traffic lanes. An illustration of the present traffic lane situation at his present position on the route is thereby displayed schematically to the driver. This makes it easier to display information for traffic lanes. For example, exact traffic lane information may be displayed directly for the schematic traffic lanes to which the information refers.

For example, the first traffic lane is assigned to the first schematic traffic lane so that the graphic object shows that the first traffic lane is the target traffic lane. It is hereby beneficially displayed to the driver which traffic lane is the target traffic lane. The decision to make a lane change is thereby made easier for the driver.

Furthermore, for the schematic traffic lanes that are assigned to the existing traffic lanes that are not determined to be the target traffic lane, an additional graphic object may respectively be generated that indicates that it is not the target traffic lane. An additional graphic object may then be generated for example on each schematic traffic lane. The graphic object for the target traffic lane and the additional graphic objects for the non-target traffic lanes may be differentiated in one parameter. This parameter is for example the color. For example, the graphic objects may be color-coded and thus show the driver whether or not a traffic lane is a target traffic lane. Furthermore, the additional graphic objects may also be differentiated from each other. For example, a color-coding of the additional graphic objects may differentiate between "traffic lanes unsuitable for remaining on the route" and "traffic lanes that do not represent the target traffic lane but that are still suitable for remaining on the route". Traffic lanes from which only one lane change is necessary to get to the target traffic lane may thereby be seen as suitable traffic lanes. More than two lane changes are then necessary in order to get to the target traffic lane from unsuitable traffic lanes.

In a further embodiment, a second change position is determined on the route. If the present position of the vehicle corresponds with the first change position, a display change is effectuated, in which the second display is displayed in the first display region and in which a third display is generated in the second display region, which third display shows a schematic illustration of the existing traffic lanes at the second change position on the route. The display is thus updated when the first change position is reached. The previous future traffic lane situation is then displayed as the present situation, while the traffic lane situation at the second change position is displayed as the future situation. A present situation and a future situation are thereby beneficially always displayed to the driver.

The display change is thereby effectuated, e.g., by means of an animation. For the animation, the second display transitions for example into the first display region, whereby the first display in the first display region is replaced by the second display and the third display is displayed in the second display region. It is thereby visualized for the driver in a particularly simple and intuitive manner that he has reached the first change position.

In another embodiment, an actual traffic lane of the vehicle in which the vehicle is located is captured. A graphic position display object representing the vehicle is generated in the first display for the schematic traffic lane that is assigned to the actual traffic lane of the vehicle. A visual comparison of the position display object with the graphic objects then suffices to determine whether the vehicle is located in the target traffic lane.

In a further embodiment, it may be determined whether the actual traffic lane of the vehicle corresponds with the target traffic lane. If it is determined that the actual traffic lane corresponds with the target traffic lane, the graphic position display object assumes a first appearance. On the other hand, if it is determined that the actual traffic lane does not correspond with the target traffic lane, the graphic position display object assumes a second appearance. The appearances of the graphic position display object may thereby in turn be differentiated by their color. For example, the graphic position display object is displayed entirely or partially in green if the actual traffic lane corresponds with the target traffic lane. The graphic position display object is then displayed entirely or partially in red if the actual traffic lane does not correspond with the target traffic lane. Alternatively, the graphic position display object in the second appearance may comprise a graphic warning object, for example an exclamation point.

Furthermore, if the actual traffic lane does not correspond with the target traffic lane, a lane change recommendation may be output. It is hereby made clear to the driver through the display that he should change lanes.

For example, an additional message is output that shows whether the vehicle is located in the target traffic lane. This message is displayed for example in text form in the first display region. If the vehicle is not located in the target traffic lane, "vehicle in wrong lane" is output, for example. If the vehicle is located in the correct traffic lane, "vehicle in correct lane" is output, for example.

The invention furthermore relates to a device for displaying traffic lane information in a vehicle. In one exemplary aspect, the device comprises a positioning device, by means of which the present position of the vehicle on a route may be captured. Furthermore, the device comprises a detecting device, by means of which a number of existing traffic lanes may be detected at the present position in the direction of travel of the vehicle on the route, and by means of which the lane course of the existing traffic lanes lying in the direction of travel of the vehicle ahead of the vehicle may be detected, wherein a first traffic lane, which is a target traffic lane for the vehicle, may be detected from the lane course. Furthermore, a change position may be detected by means of the detecting device, from which a second and no longer the first traffic lane is the target traffic lane for the vehicle.

Moreover, the device comprises a first display region, a second display region and a control device. By means of the control device, the first display region is controllable such that in the first display region a first display may be generated, which shows a schematic illustration of the existing traffic lanes at the present position of the vehicle, which schematic illustration comprises schematic traffic lanes, wherein the number of the schematic traffic lanes corresponds to the number of the existing traffic lanes such that an existing traffic lane may be assigned a schematic traffic lane in each case. Moreover, for at least one first schematic traffic lane, a graphic object may be generated by means of the control device, which graphic object indicates whether the traffic lane assigned to the first schematic traffic lane is the target traffic lane. Furthermore, the second display region may be controlled such that, in the second display region, a second display may be generated, which shows a schematic illustration of the existing traffic lanes at the change position on the route. The device is designed, e.g., to perform the method according to the first aspect and therefore shows all benefits of the method.

The device also comprises a display area on which the first and the second display regions are arranged. Accordingly, the display area of the device is thereby arranged in particular in a combination instrument of the vehicle. A compact display may hereby be provided for the driver.

The first display region may be arranged on a display area, such as directly below the second display region so that the first display may be displayed below the second display. The display is thus designed in particular with two rows. This design beneficially gives the driver a compact display so that the driver does not need to search within the vehicle for the different displays.

Furthermore, the device may comprise a capturing device, by means of which an actual traffic lane of the vehicle in which the vehicle is located may be captured. The capturing device may be designed for example as a camera. The image captured by the camera is analyzed for example by means of algorithms, which may recognize dividing lines between the different traffic lanes. It may thereby be recognized in which of the existing traffic lanes the vehicle is located.

The invention furthermore relates to a vehicle with such a device.

The present invention is now explained below based on exemplary embodiments with reference to the drawings.

With reference to FIG. 1, a vehicle 1 with a device 2 according to an embodiment of the invention is explained.

The device 2 comprises a display area 3, which is arranged for example in the combination instrument panel of the vehicle 1. The driver may thereby look at the display area 3 by looking down briefly. The driver's attention is thereby only diverted to the display area very briefly.

The device 2 furthermore comprises a control device 4 with a computing device 5 and a positioning device 7. The positioning device 7 is thereby designed in particular as a GPS receiver.

The device 2 furthermore comprises a detecting device 6. By means of the detecting device 6, the number of the existing traffic lanes at the present position of the vehicle 1 may be detected. Furthermore, by means of the detecting device 6, the lane course of the existing traffic lanes in the direction of travel F ahead of the vehicle 1 may be detected. This means that the lane course of each existing traffic lane may be detected over the course of the entire route and made available to the device 2.

The control device 4 may serve as a navigation system for the vehicle 1 together with the display area 3, the positioning device 7 and the detecting device 6. In particular, high-precision maps are thereby saved in the computing device 5 of the control device 4, which have lane information for each position in the road system of a country. Lane information is thereby in particular the number of lanes and the lane course of traffic lanes. It may thereby be determined in particular which traffic lanes, for example of a freeway, end in an exit, lead to another freeway, turn into, end in or are added to a bus or taxi lane.

Through such high-precision maps, it is then possible to provide a current traffic lane display for the vehicle 1 for each location of a route.

Furthermore, the device 2 comprises a capturing device 14, which is designed as a camera. By means of the camera 14, an actual traffic lane of the vehicle 1 may be detected. This means that it may be detected in which of the existing traffic lanes the vehicle 1 is presently located.

Figure 2:
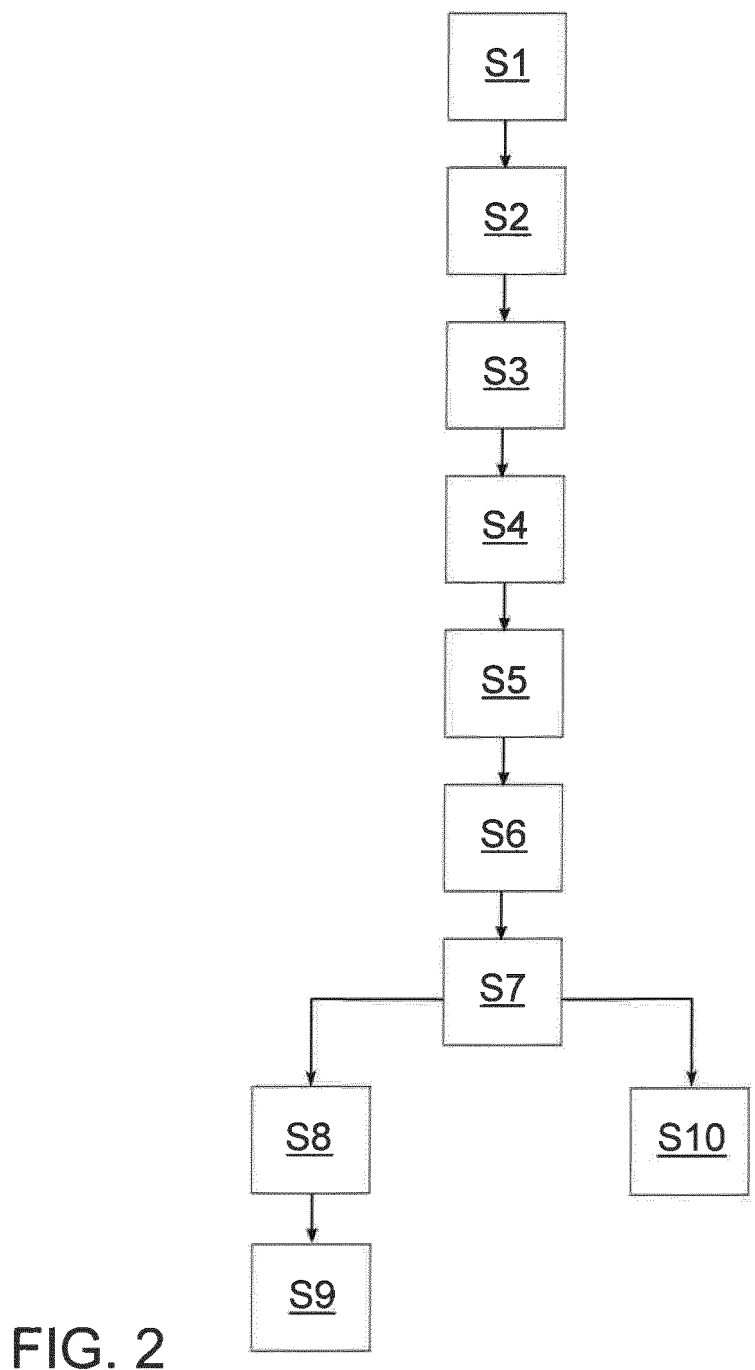
FIG. 2 shows a flow chart for a first exemplary embodiment of a method for displaying lane information.
Figure 3:
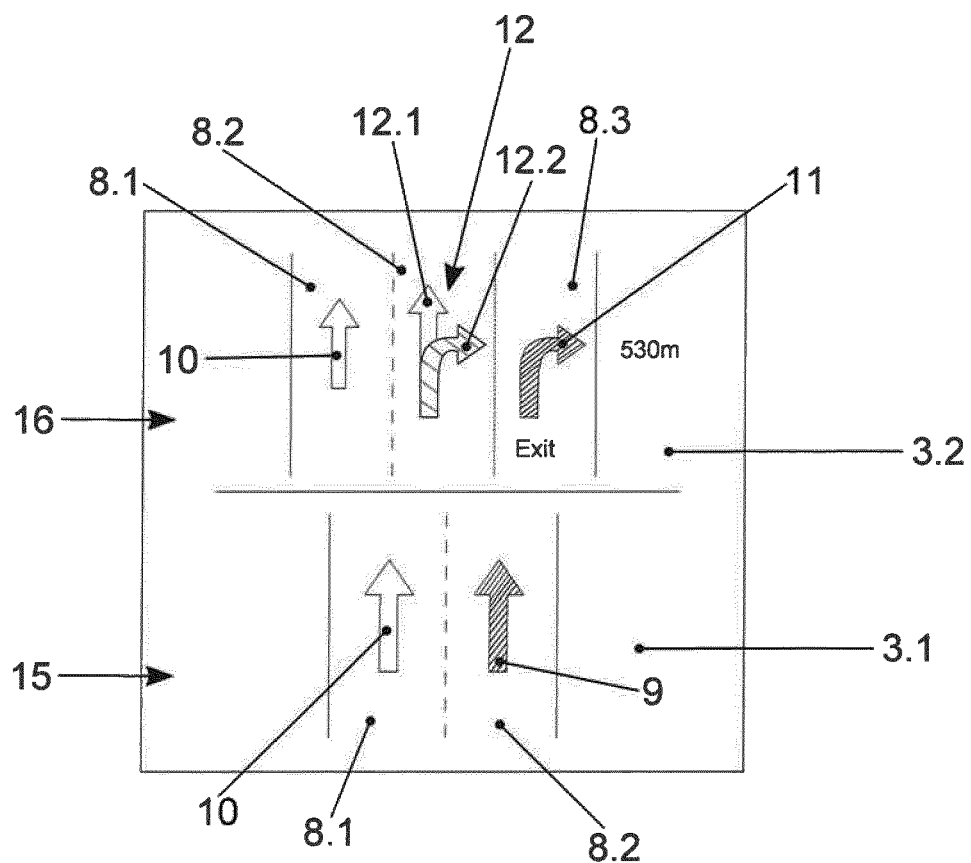
FIG. 3 shows a display as generated by the first exemplary embodiment.

With reference to FIGS. 2 and 3, a first exemplary embodiment of the method as well as a display, as generated by the first exemplary embodiment of the method on the display area 3, are explained.

The initial situation of the first exemplary embodiment of the method is that the vehicle 1 is located on a previously determined route from a start point to an end point.

In a first step S1 of the method, the present position of the vehicle 1 on the route is captured via the GPS receiver 7. In the explained exemplary embodiment, it is captured that the vehicle 1 is located on a freeway.

In step S2, the number of traffic lanes located at the present position of the vehicle 1 on the route is captured. In the present example, it is determined that two traffic lanes in the direction of travel F of the vehicle 1 are located at the present position of the vehicle 1 on the route.

In step S3, the lane course of the traffic lanes lying in the direction of travel F of the vehicle 1 ahead of the vehicle 1 is determined. This is determined in particular via the high-precision maps, which are saved in the computing device 5.

From the lane course, a target traffic lane for the vehicle 1 is then detected in step S4. The target traffic lane thereby shows the traffic lane in which the vehicle 1 should be located in order to remain on the route. This means, e.g., that a lane change is not necessary in order to follow the route. In the present example, the right traffic lane of a left and a right traffic lane is determined to be the target traffic lane.

Furthermore, a first change position on the route is determined in step S5. The target traffic lane changes as of the first change position. This means that a second traffic lane is determined which shows the target traffic lane as of the first change position, while the first traffic lane is no longer the target traffic lane. This is for example the case if the first traffic lane ends. Moreover, another traffic lane may appear which provides an exit that the driver should take to remain on the route. The first traffic lane then continues to be present but is no longer the target traffic lane. For the driver, this means that he must make a lane change at the first change position in order to remain on the target traffic lane. For example, a distance to the first change position is additionally determined. In the present example, it is determined that the road surface increases by a third traffic lane in addition to the already existing traffic lanes. The third traffic lane is then the right traffic lane, the previous right traffic lane becomes the middle traffic lane and the left traffic lane remains the left traffic lane. It is furthermore determined that the added third traffic lane becomes the target traffic lane. In order to remain on the route, the driver must thus make a lane change.

In step S6, the display shown in FIG. 3 is generated on the display area 3. The display is thereby divided into a first display region 3.1 and a second display region 3.2.

In the first display region 3.1, a first display 15 is generated, which displays a schematic illustration of the existing traffic lane situation. In the present example, two schematic traffic lanes 8.1 and 8.2 that are separated from each other by a center line are displayed. The right traffic lane was thereby determined to be the target traffic lane in step S4. A graphic object 9 is thus generated on the right schematic traffic lane 8.2. The graphic object 9 shows an arrow pointing straight ahead. The direction of the arrow shows the driver that the lane remains unchanged for a certain distance, for example the next 500 m. Furthermore, the arrow is colored dark blue, for example. The coloring thereby shows the driver that the traffic lane 8.2 is the target traffic lane. Furthermore, a second graphic object 10 is generated on the schematic traffic lane 8.1, which also shows an arrow pointing straight ahead. This second arrow is colored gray, for example. This coloring thereby shows the driver that the traffic lane 8.1 is not the target traffic lane.

In the second display region 3.2, a second display 16 is generated, which displays a schematic illustration of the existing traffic lane situation at the first change position. The second display 16 is expanded with respect to the first display 3.1 by a third schematic traffic lane 8.3 to the right next to the schematic traffic lane 8.2. Furthermore, a graphic object 11 is generated on the third schematic traffic lane 8.3. This graphic object 11 shows an arrow pointing to the right. This means that following this traffic lane leads to the driver exiting the freeway to the right. For example, the traffic lane is an exit from the freeway. This is clarified for example by the note "Exit" being displayed below the graphic object 11. Furthermore, the distance still available for the lane change after reaching the first change position may be displayed next to the schematic traffic lane 8.3. In the present example, this is 530 m. Furthermore, the graphic object 11 is also colored dark blue in order to clarify to the driver that the third traffic lane is the target traffic lane. The graphic object 12 is displayed on the schematic traffic lane 8.2. The graphic object 12 is made up of an arrow 12.1 pointing straight ahead and an arrow 12.2 pointing to the right. The arrow 12.2 pointing to the right is thereby colored light blue for example and indicates that the vehicle 1 is not in the target traffic lane but is in a suitable traffic lane. In this case, suitable means that only one lane change is necessary in order to get to the target traffic lane. Furthermore, the graphic object 10, which is also generated on the schematic traffic lane 8.1 in the first display region 3.1 is displayed on the schematically illustrated traffic lane 8.1. The light gray coloring thereby shows that this traffic lane is an unsuitable traffic lane. If the vehicle 1 is located in the traffic lane associated with the schematic traffic lane 8.1, more than one lane change is necessary in order to get to the target traffic lane.

It is determined in step S7 whether the vehicle 1 has reached the first change position on the route.

If it is determined that the vehicle 1 has reached the first change position, a second change position on the route is determined in step S8 of the method.

A display change is effectuated in step S9. The second display 16 from the second display region 3.2 thereby transitions into the first display region 3.1. In the second display region 3.2, a third display is then generated, which shows a schematic illustration of the traffic lane situation at the second change position on the route. The display change may thereby take place for example by means of an animation. The animation is thereby executed such that the second display 16 from the second display region 3.2 drops down into the first display region 3.1 and the first display 15 is thereby gradually covered by the second display 16. Simultaneously, the third display referencing the traffic lane situation at the second change position gradually appears in the second display region 3.2.

If it is determined that the vehicle 1 has not yet reached the first change position, the display generated in step S6 is retained on the display area 3 in step S10 of the method.

Figure 4:
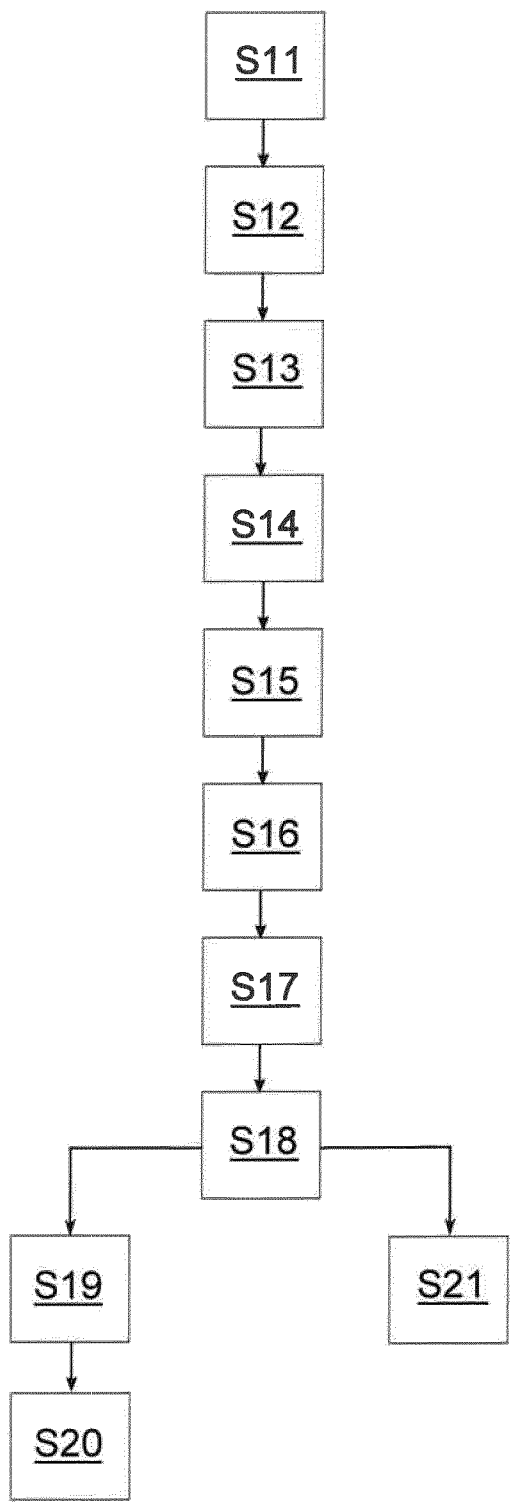
FIG. 4 shows a flow chart for a second exemplary embodiment of the method for displaying lane information.
Figure 5A:
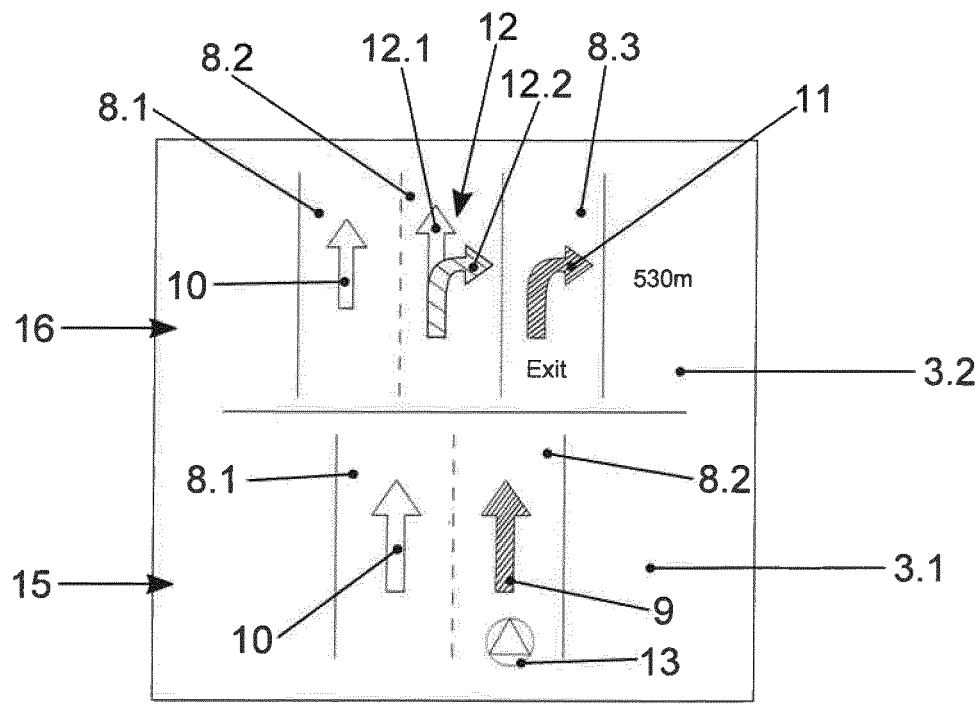
FIGS. 5a and 5b show displays as generated by the second exemplary embodiment.
Figure 5B:
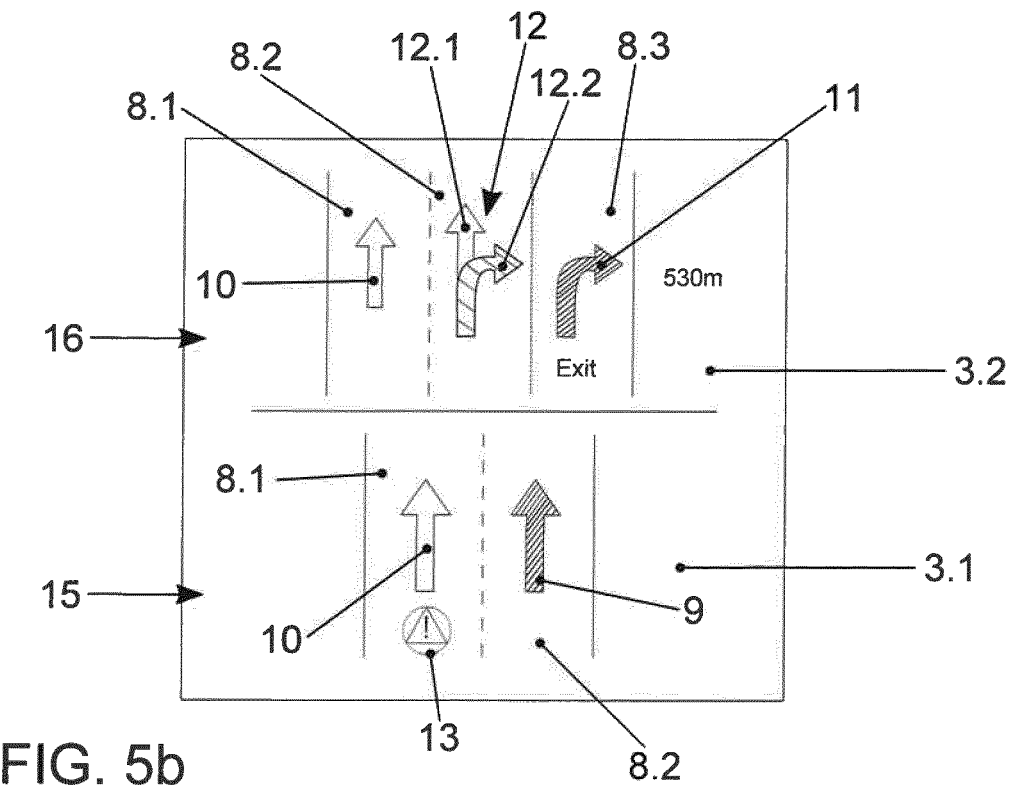

With reference to the FIGS. 4 and 5a and 5b, a second exemplary embodiment of the method and displays generated by the second exemplary embodiment of the method are explained.

The initial situation of the second exemplary embodiment of the method is thereby in turn that the vehicle 1 is located on a previously determined route from a start point to an end point. In the explained exemplary embodiment, the vehicle 1 is located on a freeway.

The steps S11 through S14 thereby correspond to the steps S1 through S4 of the first exemplary embodiment of the method.

In step S15, the actual traffic lane in which the vehicle 1 is actually located is captured by means of the camera 14. For this, the image of the traffic lane situation captured by the camera 14 is transmitted to the control device 4. Algorithms are saved in the computing device 5 by means of which the transmitted image may be evaluated. The algorithms may recognize, e.g., the boundary lines between the different traffic lanes. It may then be deduced from the positions of the boundary lines relative to the camera in which of the existing traffic lanes the vehicle 1 is located.

The step S16 corresponds to the step S5 of the first exemplary embodiment of the method.

In step S17, either the display shown in FIG. 5a or in FIG. 5b is generated on the display area 3.

The displays of the FIGS. 5a and 5b thereby mainly correspond to the display shown in FIG. 3.

In addition to the graphic objects 9 and 10, a graphic position display object 13 is displayed in the first display region 3.1. The position of the graphic position display object 13 is thereby dependent on the traffic lane in which the vehicle 1 is located.

If the actual traffic lane in which the vehicle 1 is actually located corresponds with the target traffic lane, the graphic position display object 13 is displayed at the right schematic traffic lane 8.2. Moreover, if the graphic position display object 13 is located at the schematic traffic lane 8.2, it assumes a first appearance that shows the driver that the actual traffic lane in which the vehicle 1 is actually located corresponds with the target traffic lane. For example, for this, the graphic position display object 13 may be colored entirely or partially in green. Additionally, a note in text form may be displayed that indicates to the driver that he is in the correct traffic lane.

If the actual traffic lane in which the vehicle 1 is actually located does not correspond with the target traffic lane, the graphic object 13 is displayed at the left schematic traffic lane 8.2. Moreover, if the graphic position display object 13 is located at the schematic traffic lane 8.2, it assumes a second appearance that shows the driver that the actual traffic lane in which the vehicle 1 is actually located does not correspond with the target traffic lane. The graphic object 13 has for this an additional warning signal, for example an exclamation point. Alternatively or additionally, the graphic object 13 may be colored entirely or partially in red. Additionally, a note in text form may be displayed that indicates to the driver that he is in the wrong traffic lane.

The further method steps S18 through S21 correspond to the method steps S7 through S10 of the first exemplary embodiment of the method.

In the case of the two exemplary embodiments, additional lane information may be displayed. For example, the determined lane course may be used not only to determine the target traffic lane. The lane course may be output individually for each existing traffic lane.

Moreover, for the purpose of navigation, additional navigation instructions may be displayed in the second display region 3.2. The display shown in the second display region 3.2 refers finally to future lane changes, which make a potential lane change necessary.

LIST OF REFERENCE NUMBERS

1 Vehicle
1 Device
3 Display area
3.1; 3.2 First display region; second display region
4 Control device 5 Computing device
6 Detecting device
7 Positioning device
8.1-8.3 Schematic traffic lanes
9-12 Graphic objects
12.1, 12.2 Arrows
13 Additional graphic object
14 Capturing device; camera
15 First display
16 Second display
S1-S10 Method steps
S11-S21 Method steps
F Direction of travel The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for displaying lane information in a vehicle, comprising:
   determining the present position of the vehicle on a route;
   determining, a number of existing traffic lanes at the present position of the vehicle in a direction of travel of the vehicle on the route;
   determining, using a camera, an actual traffic lane from the existing traffic lanes, wherein the vehicle at the present position is located in the actual traffic lane;
   determining the lane course of the existing traffic lanes ahead of the vehicle in the direction of travel of the vehicle;
   determining a target traffic lane from the determined lane course;
   determining at least one suitable traffic lane from the determined lane course, which suitable traffic lane is arranged adjacent to the target traffic lane so that only one lane change is necessary to get to the target traffic lane;
   generating, in a first display region pertaining to the present position of the vehicle, a first display which shows a schematic illustration of the existing traffic lanes at the present position of the vehicle, which schematic illustration comprises one or more schematic traffic lanes, wherein the number of the schematic traffic lanes corresponds to the number of the existing traffic lanes, such that each existing traffic lane is assigned a schematic traffic lane;
   generating, in the first display region pertaining to the present position of the vehicle, for at least one first schematic traffic lane, a graphic object, which indicates whether the one first schematic traffic lane is the target traffic lane;
   generating, in the first display region pertaining to the present position of the vehicle, for at least one second schematic traffic lane, a graphic object, which indicates whether the second schematic traffic lane is the suitable traffic lane;
   generating, in the first display region pertaining to the present position, a graphic position display object representing the vehicle in the actual traffic lane;
   determining a first change position on the route, from which a second traffic lane is the target traffic lane for the vehicle;
   generating, in a second display region, a second display, which shows a schematic illustration of the traffic lanes at the first change position on the route;
   detecting a second change position on the route; and
   if the present position of the vehicle corresponds with the first change position, conducting a display change, in which the second display is displayed in the first display region and in which a third display is generated in the second display region, which shows a schematic illustration of the existing traffic lanes at the second change position on the route.

2. The method of claim 1, wherein for the schematic traffic lanes that are assigned to the existing traffic lanes that are not determined to be a target traffic lane for the vehicle, an additional graphic object is respectively generated that indicates that it is not the target traffic lane.

3. The method of claim 1, wherein the display change is effectuated with an animation.

4. The method of claim 3, wherein for the animation, the second display transitions into the first display region, wherein the first display in the first display region is replaced by the second display and the third display is displayed in the second display region.

5. The method of claim 1, wherein it is determined whether the actual traffic lane of the vehicle corresponds with the target traffic lane; if it is determined that the actual traffic lane corresponds with the target traffic lane, the graphic position display object assumes a first appearance and
   if it is determined that the actual traffic lane does not correspond with the target traffic lane, the graphic position display object assumes a second appearance.

6. The method of claim 5, wherein if the actual traffic lane does not correspond with the target traffic lane, a lane change recommendation is output.

7. The method of claim 1, wherein an additional indicator is output that shows whether the vehicle is located in the target traffic lane.

8. A device for displaying lane information in a vehicle, comprising:
   a positioning device, using which the present position of the vehicle on a route can be determined;
   a detecting device, using which a number of existing traffic lanes at the current position in a direction of travel of the vehicle on the route can be detected and using which a lane course of the existing traffic lanes in the direction of travel of the vehicle ahead of the vehicle can be detected, wherein a target traffic lane can be determined from the lane course, vehicle, and using which a change position can be detected, as of which a second lane is the target traffic lane for the vehicle, and wherein at least one suitable traffic lane can be determined from the lane course, which suitable traffic lane is arranged adjacent to the target traffic lane so that only one lane change is necessary to get to the target traffic lane;
   a camera, using which an actual traffic lane can be determined from the existing traffic lanes, wherein the vehicle at the present position is located in the actual traffic lane;

the device for displaying lane information further comprising:

a first display region;

a second display region; and a control device, using which the first display region is controllable such that in the first display region a first display can be generated, which shows a schematic illustration of the existing traffic lanes at the present position of the vehicle, which schematic illustration comprises schematic traffic lanes, wherein the number of the schematic traffic lanes corresponds to the number of the existing traffic lanes, such that each existing traffic lane can be assigned a schematic traffic lane; wherein for at least one first schematic traffic lane, a graphic object can be generated, which indicates whether the first schematic traffic lane is the target traffic lane;

for at least one second schematic traffic lane, a graphic object can be generated, which indicates whether the second schematic traffic lane is the suitable traffic lane;

a graphic position display object can be generated, representing the vehicle in the actual traffic lane;

and the second display region can be controlled such that in the second display region a second display can be generated, which shows a schematic illustration of the existing traffic lanes at the change position on the route; wherein a second change position is detected on the route; and the first display region and the second display region are controllable, so that, if the present position of the vehicle corresponds with the first change position, a display change is effectuated, in which the second display is displayed in the first display region and in which a third display is generated in the second display region, which shows a schematic illustration of the existing traffic lanes at the second change position on the route.

9. The device of claim 8, wherein the device comprises a display area, on which the first and the second display region are arranged.

10. The device of claim 8, wherein the first display region is arranged directly below the second display region so that the first display can be displayed below the second display.

11. A vehicle with a device of claim 8.

12. A method for displaying lane information in a vehicle, comprising:

determining the present position of the vehicle on a route;

determining a number of existing traffic lanes at the present position of the vehicle in a direction of travel of the vehicle on the route;

determining, using a camera, an actual traffic lane of the vehicle in which the vehicle is presently located;

determining the lane course of the existing traffic lanes ahead of the vehicle in the direction of travel of the vehicle;

determining a first traffic lane is determined from the lane course, which is a target traffic lane for the vehicle;

generating, in a first display region, a first display which shows a schematic illustration of the existing traffic lanes at the present position of the vehicle, which schematic illustration comprises schematic traffic lanes, wherein the number of the schematic traffic lanes corresponds to the number of the existing traffic lanes, such that each existing traffic lane is assigned a schematic traffic lane;

generating, for at least one first schematic traffic lane, a graphic object, which indicates whether the traffic lane assigned to the first schematic traffic lane is the target traffic lane;

generating, in the first display region, a graphic position display object representing the vehicle in the actual traffic lane;

determining, if the actual traffic lane corresponds with the target traffic lane at the present position, and if the actual traffic lane does not correspond with the target traffic lane at the present position, output a lane change recommendation;

determining a first change position on the route, from which a second and no longer the first traffic lane is the target traffic lane for the vehicle;

generating, in a second display region, a second display, which shows a schematic illustration of the existing traffic lanes at the first change position on the route;

detecting a second change position on the route; and if the present position of the vehicle corresponds with the first change position, conducting a display change, in which the second display is displayed in the first display region and in which a third display is generated in the second display region, which shows a schematic illustration of the existing traffic lanes at the second change position on the route; wherein the first display region and the second display region are arranged adjacent to each other along a vertical axis on a display screen.

* * * * *